United States Patent [19]

Fernandez-Moran Villalobos

[11] 4,273,561
[45] Jun. 16, 1981

[54] ULTRASHARP POLYCRYSTALLINE DIAMOND EDGES, POINTS, AND IMPROVED DIAMOND COMPOSITES, AND METHODS OF MAKING AND IRRADIATING SAME

[76] Inventor: Humberto Fernandez-Moran Villalobos, 55 Dartmouth Rd., Williams Bay, Wis. 53191

[21] Appl. No.: 63,685

[22] Filed: Aug. 6, 1979

Related U.S. Application Data

[63] Continuation of Ser. No. 896,571, Apr. 4, 1978, which is a continuation-in-part of Ser. No. 852,022, Nov. 16, 1977, Pat. No. 4,164,680, which is a continuation-in-part of Ser. No. 608,260, Aug. 26, 1975, Pat. No. 4,084,942.

[51] Int. Cl.$^3$ .............................................. B24D 3/04
[52] U.S. Cl. ...................................... 51/307; 51/309; 83/171
[58] Field of Search ................. 51/295, 307, 308, 309; 83/171

[56] References Cited

U.S. PATENT DOCUMENTS

| | | | |
|---|---|---|---|
| 4,084,942 | 4/1978 | Villalobos | 51/309 R |
| 4,164,680 | 8/1979 | Villalobos | 313/311 |

*Primary Examiner*—Donald E. Czaja
*Assistant Examiner*—W. Thompson

*Attorney, Agent, or Firm*—Robert E. Burns; Emmanuel J. Lobato; Bruce L. Adams

[57] ABSTRACT

Ultrasharp polycrystalline diamond edges, points, and improved diamond composites of predetermined configuration usable as cutting instruments, as high intensity sources for the emission of electrons, ions, neutrons, x-rays, coherent and incoherent light and high frequency electromagnetic radiation, and as ultraprecision molded mechanical and optical parts, or as high field permanent magnets or electrets, are produced by preparing and classifying natural and synthetic ultrafine uniform graphite particles, preferably of the rhombohedral phase, which are directly converted into diamond particles having a particle size of 3 to 100 angstroms, placing the ultrafine powder, either before or after the synthesis, with or without suitable additives, in a diamond mold defining the ultrafine edge or form to be produced, and applying a pressure of the order of 80 to 90 kb, preferably dynamic or static ultrahigh pressures of 100 to about 1000 kb, while heating the powder to a temperature of the order of 2440° K. to 2500° K., or preferably in the range of 2500° to 3000° K., in an ultrahigh vacuum or inert atmosphere after degassing to remove contaminants and avoid oxidation of the diamond powder. The requisite dimensional tolerances of the order of 10 to 100 angstroms are reproducibly obtained by final electron beam glazing and annealing using liquid helium systems with superconducting lenses of special design.

24 Claims, 1 Drawing Figure

ULTRASHARP POLYCRYSTALLINE DIAMOND EDGES, POINTS, AND IMPROVED DIAMOND COMPOSITES, AND METHODS OF MAKING AND IRRADIATING SAME

REFERENCE TO PRIOR APPLICATION

This is a continuation of application Ser. No. 896,571, filed Apr. 4, 1978, now abandoned, which is a continuation-in-part of my application Ser. No. 852,022 filed Nov. 16, 1977 (and now U.S. Pat. No. 4,164,680) which is a continuation-in-part of my application Ser. No. 608,260 filed Aug. 26, 1975 and now U.S. Pat. No. 4,084,942.

FIELD OF THE INVENTION

The present invention relates to the production of ultrasharp polycrystalline diamond edges and points which are produced or synthesized from natural or synthetic graphite, vitreous carbon, nongraphitizing carbons and related materials and which are usable as cutting tools, and as high intensity point sources for the emission of electrons, ions, neutrons, x-rays, coherent and incoherent light and high frequency electromagnetic radiation and the production of precision molded parts with special properties including magnetic properties.

BACKGROUND OF THE INVENTION

Ultrasharp diamond edges made from single crystal natural diamonds using special cutting and grinding methods and electron-optical control as disclosed in my U.S. Pat. Nos. 2,961,908, 3,060,781 and 3,646,841—commonly referred to as "diamond knives"—are highly useful as cutting instruments of unprecedented sharpness and also as high intensity point sources for the emission of electrons, ions and neutrons. Thus when used as cutting instruments, they are capable of molecular and submolecular sectioning at ultralow temperature in ultramicrotomy in the preparation of specimens for examination in an electron microscope. They are also useful in surgery, particularly in delicate operations such as operations on the eye. It has also been found that metals and other materials can be machined with a diamond knife to obtain a perfectly smooth surface which is free of the scratches and other imperfections resulting from usual machining and polishing operations.

When used as point sources, ultrasharp diamond edges and points in accordance with my prior patents are coated with a thin film of suitable material such as tungsten, rhenium, lanthanum, barium, caesium and other related materials of appropriate work function and physical properties for electron emission. When thus coated the ultrasharp diamond edge or point by reason of its extremely small radius (10 to 100 Å) serves as a highly effective emitter for electrons, ions, x-rays, neutrons and other types of radiation.

However, the use of monocrystalline ultrasharp diamond edges and points has been limited by the cost of production and by limitations on the length of diamond edges that could be made. As high quality diamond knives are made from gem quality diamonds, the cost of such knives has accordingly been high. Moreover, by reason of larger diamonds not being available at economically acceptable prices, the length of the cutting edge of a diamond knife has been limited to less than 10 mm and is usually in the 1 to 3 mm range.

As for use of diamond edges or points as cathodes or other emission electrodes, the useful life of the electrode has been limited by the dissipation of the metallic coating material. When such material has been depleted it is necessary to discard or recoat the electrode. As such electrodes are normally hermetically sealed in an appropriate envelope, the removal, recoating, remounting and resealing of the electrodes may not be economically feasible.

The limitations imposed by the size, cost and comparative rarity of suitable natural diamonds have been overcome by the production of ultrasharp polycrystalline diamond cutting edges and points as disclosed in my application Ser. No. 852,022. In accordance with the disclosure of this application, ultrasharp diamond edges and points are produced from ultrafine diamond powder by molding and bonding the powder at high temperatures and pressures in an ultrahigh vacuum or an inert atmosphere such as helium. In this manner an implement of any desired size and shape can be produced. Moreover, when the ultrasharp edge or point is to be used for electron or other emission, low work function or other emissive material in finely divided powdered form can be mixed with the diamond powder so as to be incorporated in the body of the electrode instead of being applied as a surface coating. The useful life of the electrode can thereby be greatly increased.

SUMMARY OF THE INVENTION

It is an object of the present invention further to advance the art of producing ultrasharp diamond edges and points by using graphite, vitreous carbons, nongraphitizing carbons and related abundant natural and synthetic forms of carbon as the starting material instead of diamonds. Not only is such material much less expensive than diamonds, but also the cost of comminuting diamonds to obtain ultrafine diamond powder is avoided since graphite and related forms of carbon are already found largely in the requisite submicroscopic particle size.

In accordance with the invention, the submicroscopic particles of graphite or other form of carbon are directly converted to diamond particles of 3 to 100 Å size and sintered within the same mold to obtain an ultrasharp diamond edge or point by applying the requisite ultrahigh pressures under ultrahigh vacuum to avoid oxidation. Alternatively the special graphite or other carbon particles can first be directly converted into diamond particles of 3 to 100 Å size and the resulting diamond particles are then molded and sintered in special apparatus as described in my application Ser. No. 852,022. In either event the ultrafine graphite particles or resulting ultrafine diamond particles may be mixed with ultrafine metallic catalytic solvents or, if the ultrafine edge or point is to be used for electron or other emission, with suitable low work function materials.

Moreover, in accordance with the invention, high-field permanent magnets are produced by the inclusion either in the form of ultrafine particles or high vacuum evaporated ultrathin coatings of ferromagnetic materials selected from the group of iron, nickel, cobalt, steel and alnico with a slight admixture of rare-earths.

As a final step, the sintered polycrystalline diamond edges, points or other shapes are subjected to electron beam glazing or polishing to obtain atomically smooth edges. In fact the irradation with electron microbeams appears to impart an additional quality of annealing or hardening which yields results orders of magnitude superior to the finest mechanical abrasion and polishing surfaces.

BRIEF DESCRIPTION OF DRAWING

The nature, objects and advantages of the invention will be more fully understood from the following description in conjunction with the accompanying drawing which illustrates schematically and in cross section apparatus used for producing sintered or synthesized polycrystalline diamond edges, points or other shapes in accordance with the invention.

DESCRIPTION OF PREFERRED EMBODIMENTS

The process in accordance with the present invention comprises the preparation of ultrafine graphite particles which are preferably at least predominantly of rhombohedral graphite, the application of ultrahigh pressure and high temperature in an ultrahigh vacuum or inert gas to convert the graphite particles into ultrafine diamond particles and the simultaneous or subsequent molding of such particles with or without additives to form a polycrystalline diamond implement having an ultrasharp edge or point or other selected shape. The term "implement" is herein used in a generic sense to denote a knife, scalpel or other cutting tool, electrode, emitter or other article having an ultrasharp edge or point or other selected shape.

PREPARATION OF POWDER

The ultrafine graphite powder used in the process of the present invention can be prepared from natural or synthetic graphite, preferably of the rhombohedral phase. While the graphite powder can be prepared by crushing bulk graphite and classifying the resulting particles, as in the case of the preparation of diamond powder, ultrafine graphite particles can be prepared more economically by using electric arc evaporation of graphite in an ultrahigh vacuum or by sputtering in a noble gas atmosphere. Natural and synthetic graphite, preferably selected for abundance of the rhombohedral form of graphite, is readily dispersed and deposited as a uniform array of individual regular particles of 3 to 100 Å size on any desired solid or liquid surface in a random or oriented coherent distribution pattern by producing an electric arc which may be pulsed or continuous, AC or DC, in an ultrahigh vacuum, for example $10^{-7}$ to $10^{-10}$ Torr, using specially adapted equipment for continuous and automated production and collection, for example through special ultrahigh vacuum seals and valves, of predominantly rhombohedral graphite particles. An alternative process which is somewhat more difficult to control but is less expensive involves the sputtering of graphite rods in an argon or helium atmosphere using high voltage. Typically, a complete set of graphite electrodes ($10 \times 2000$ mm) is totally converted into ultrafine particles within a few hours. Electron diffraction and high resolution electron microscopy confirms the particle size and clearly shows the crystalline lattice spacing characteristic of the rhombohedral structure. In either process the oxidation or contamination of the rhombohedral graphite particles is neglible and the recovery rate is several orders of magnitude more efficient than any other know mechanical or physico-chemical process of fragmentation.

When prepared in the manner described, the graphite particles produced are of a uniformly small size determined by the parameters of the process. Hence, classification of the particles is not ordinarily required. If, however, it is desired to separate the particles into homogenous populations of particles ranging in size from 10 to 50 and 50 to 100 Å, this can be carried out by density-gradient ultracentrifugation of an oil or preferably glycerol suspension of the particles, for example at 60,000 to $100,000 \times g$.

CONVERSION TO DIAMOND AND MOLDING

In accordance with the present invention ultrafine graphite particles, preferably of the rhombohedral phase, are converted into ultrafine diamond particles and simultaneously or subsequently molded into a polycrystalline diamond implement having an ultrasharp edge or point or other selected shape. Graphite and diamond are two allotropic forms of carbon which have identical chemical compositions, but quite different physical properties. Diamond is the hardest known material and is generally a poor conductor of electricity. Graphite is soft, feels greasy and is a good conductor of electricity. Yet as shown by x-ray diffraction studies, the arrangement of the carbon atoms in crystals of diamond and graphite is similar. In diamond, the carbon atoms are arranged in sheets of hexagonal, puckered rings stacked one above the other closely together (2.06 Å) in such sequence that the position of atoms in the first plane duplicates the atoms in every fourth plane thus giving a stacking sequence of ABCABC . . . . The atoms in the third sheet occupy a position symmetrically related to the position of atoms in the first two sheets. It is this symmetrical orientation together with the strong covalent bonds between the carbon atoms distributed in an infinitely repeating array to form ideally a single giant molecule which accounts for the unique hardness of diamond. The carbon atoms in graphite are also arranged in hexagonal rings with an interatomic distance within the planes which is only 1.42 Å and therefore closer than the 1.54 Å distance between the carbon atoms in diamond. In fact within the hexagonal planes graphite should be "harder" than diamond. However, the planes are spaced so far apart, i.e. 3.37 Å, that the bonding is of the weak van der Waals type and asymmetrically oriented. In the classical form of graphite the planes are only loosely held together and it can be easily cleaved. However, rhombohedral graphite features a stacking configuration of the ABCABC type similar to diamond and the sheets of hexagons are slightly puckered. Hence, sufficient compression in the stacking (c axis) direction would suffice to convert rhombohedral graphite into diamond.

In order to convert the ultrafine graphite particles into diamond and to obtain a binding of the resulting ultrafine diamond powder in accordance with the present invention, the implement to be produced is molded at high temperature and high pressure. Thus for example the pressure used is at least 50 kb and preferably of the order of 100 to 1000 kb. In fact the pressure concentrated on the ultrasharp knife edge of the implement may be of the order of 1 to 5 megabars. As will be described below, the required pressure may be obtained by explosive and/or pulsed magnetic shock forces. Preferably a maintained and preferably increasing pressure is climaxed by a shock. The temperature used is at least 2000° K. and preferably of the order of 2440° K. to 3000° K. The required precisely controlled high temperature can be obtained by conduction or radiant heating but is preferably generated by electron beam or laser heating of the workpiece. The temperature used may vary somewhat according to the molding time. For example with a pressure of 85 to 90 Kb a temperature of 2440° K. is sufficient when the molding time is 2 minutes whereas it is desirable to use a temperature of 2500° K. when the molding time is reduced to 1 minute. The required molding time is also dependent on pressure. For example with a controlled pulsed or shock pressure of the order of 100 to 1000 Kb at a controlled temperature of the order to 2000° K. to 2500° K., the time may be 1 to 10 microseconds. With pressures of the order of 80 to 90 Kb and temperatures of 2400° K. to 2500° K., the molding time may range from a few seconds to several minutes.

Moreover, the high temperature high pressure molding must be effected under conditions under which the graphite powder and resulting diamond powder cannot oxidize. Thus the molding is carried out in a ultrahigh vacuum which avoids oxidation of the graphite powder and resulting diamond powder and also serves as a heat seal which facilitates temperature control of the workpiece. The vacuum should be of the order of $10^{-8}$ to $10^{-9}$ Torr. Alternatively, the high temperature high pressure molding can be carried out in an inert atmosphere, for example helium, after the graphite powder and its enviornment have been thoroughly degassed by an ultrahigh vacuum in order to eliminate the presence of oxygen.

The mold used in the process must be formed of material having the strength, hardness and the temperature resistance required to withstand the stresses and temperature imposed on it during the molding operation. Moreover, when an ultrasharp edge or point is to be produced, the female mold must have the ability of defining on the molded implement an edge or point having the required sharpness, e.g. a radius of 10 to 100 Å. In order to meet these requirements both portions of the mold are preferably formed of diamond which may be either natural diamond, when size permits, or a polycrystalline molded diamond structure produced in accordance, with the present invention. Alternatively, the mold can be formed of special ceramics based on ultrafine (10–50 Å) particles of aluminum oxide, zirconium oxide, or tungstate with an appropriate binder, for example suitable epoxy plastics. To avoid the molded article sticking to the mold, suitable lubricant or separating material, for example sodium chloride, can be used.

When the conversion of the graphite particles to diamond and the molding of the resulting ultrafine diamond particles to form an ultrasharp edge or point are to be carried out sequentially rather than in a single operation, the ultrafine graphite particles may be coated with an ultrafine coating of metal such as platinum, niobium or rhenium to inhibit cohesion of the graphite particles under the application of high pressure and high temperature to effect the conversion to diamond. Such coating is effected by evaporation of the metal in a high vacuum and is of atomic or pauci-atomic thickness. However, when the conversion of ultrafine graphite particles to ultrafine diamond particles is effected by shock pressure, there is not sufficient time for cohesion to be effected. In order to obtain larger amounts of diamond particles, a larger and preferably disposable special container is used in the conversion process instead of the mold used for production of an ultrasharp edge or point. The resulting synthetic diamond particles produced by the conversion process may be subjected to suitable cleaning procedures, for example treatment with hydrogen gas at about 1200° K. and a pressure of about 10 to 50 atmospheres in a special quartz tube or boat to remove any residual graphite. The cleaned ultrafine diamond particles are then filled into the special ultraprecision diamond edge or point or other mold and subjected to high pressures of the order of 80 to 90 Kb and temperatures of the order of 2400° K. to 2500° K. for periods ranging from a few seconds to several minutes to produce a polycrystalline implement as described in my application Ser. No. 852,022. When molding the diamond particles to form a polycrystalline diamond implement, the diamond particles may be vacuum coated with a lower melting point material as described below to assure cohesion.

ADDITIVES

In producing a polycrystalline diamond implement in accordance with the present invention selective additives may be used to promote bonding of the particles and/or impart special properties to the finished product. Thus for example a wide variety of ultrafine metallic catalytic solvents such as iron, nickel, cobalt, chromium, manganese, palladium, iridium, platinum, tantalum, ruthenium, most of which belong to group VIII of the periodic table can be used. It is also possible to use certain binary catalytic systems forming alloys typically of transition elements such as titanium, zirconium, niobium, molybdenum, tungsten and hafnium which belong to group IVa, Va or VIa of the periodic table combined with elements such as copper, silver or gold of group Ib of the periodic table. The ultrafine particles of metallic materials are similarly prepared by high vacuum arc evaporation or sputtering in a nobel gas atmosphere. Alternatively, the metallic materials may be applied as a coating of atomic or pauci-atomic thickness on the graphite particles. Other possible inclusions are rhenium, lathanum hexaborate, barium and caesium. The amount of additive used may be between 20 and 55 wt.%.

When the ultrafine particles of graphite are first converted to diamond and the resulting ultrafine diamond powder is then molded to form a polycrystalline implement additives for bonding and/or additives for imparting electrical or other properties may be used as disclosed in my application Ser. No. 608,260. Such additives may be in the form of ultrafine particles or a coating of the individual particles of diamond powder.

APPARATUS

Figure 1:
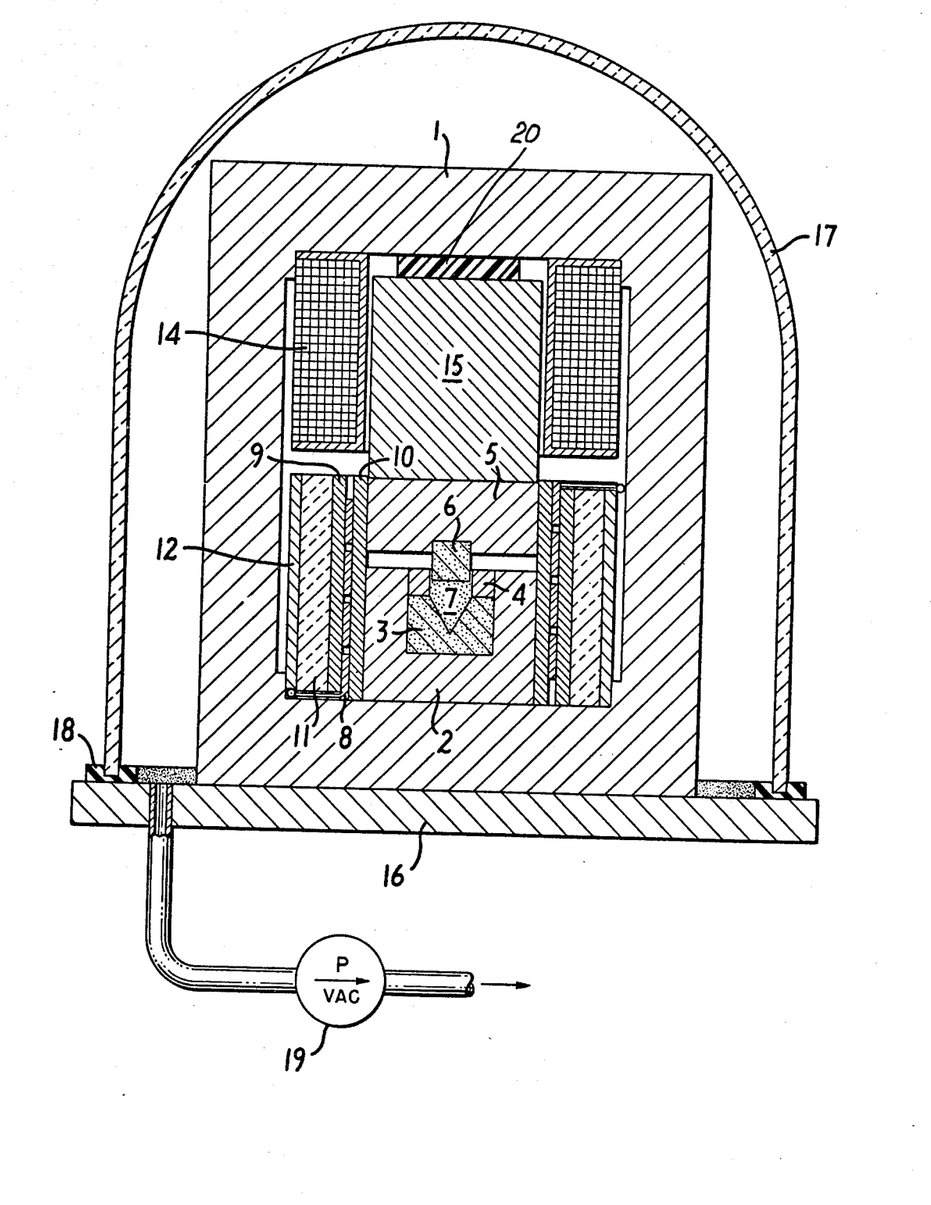

In the accompanying drawing there is show schematically apparatus for carrying out the molding operation in accordance with the present invention. The apparatus is shown as comprising a hollow rectangular frame 1 of high strength material, for example high tensile steel. On the base portion of the frame 1 there is positioned a mold holder 2 which may likewise be formed of high tensile steel and is provided with a central cavity to receive a female mold 3 formed of a diamond, molded diamond composition or other suitable material. Within the cavity of the mold holder and superposed on the diamond mold, there is provided a collar 4 of hard high strength heat resistant material, for example high tensile steel or tungsten carbide. A second mold holder 5 likewise formed of high tensile steel is provided with a central cavity to receive a male mold 6 likewise formed of natural or molded diamond or other hard material. The graphite or diamond powder 7 which is to be molded is confined in a mold cavity defined by the female mold 3, the retaining collar 4 and the male mold 6.

Means is provided for heating the powder to be molded to the required temperature (2440° K. to 2500° K.) during molding. The heating means is shown schematically in the drawings as comprising an electrical resistance heating element 8 surrounding the mold and mold holders. For example, the heating element may comprise a strip of Kantal, rhenium, tungsten or other suitable resistance material. The electrical resistance heating element 8 can surround the mold, as shown, or can be placed directly within the mold, close to a precision thermocouple connected through a suitable amplifier-recorder-feedback circuit to the heater power supply in order to maintain the requisite temperature during the high pressure cycle. The heating element 8 is shown electrically insulated on both sides by layers 9 and 10 of suitable insulating material such as pyrophyllite or lithographic stone. Heat insulation is provided by a thick layer 11 of suitable thermal insulating material such as, pyrophyllite, asbestos or lithographic stone which surrounds the heating element with its electrical insulation. The heating element and electrical and thermal insulation are assembled within a retaining sleeve 12 formed for example of steel.

Instead of heating conductively as shown, heating to the required temperature may be effected by other means, for example by induction heating, microwave radio frequency heat, a laser beam or an electron beam. The ultrahigh vacuum under which the heating is effected facilitates the use of laser or electron beam heating introduced through diamond windows provided in suitable oriented apertures. Alternatively, a cooled copper target bonded to diamond heat sinks (of type IIa diamond) may be used in conjunction with suitably placed electron beam guns embedded in a heat refractory and insulating matrix close to the mold.

Suitable means is provided for applying the required pressure (85 to 90 Kb) during molding. As illustrated by way of example in the drawing, the pressure applying means comprises a superconductive electromagnet comprising a superconductive winding 14 and armature 15 formed for example of soft iron or other material having suitable magnetic properties. Superconductivity of the winding is achieved through the use of ultralow temperatures. By virtue of the superconductivity of the winding, the forces required to achieve the desired pressure can be achieved. Suitable cryogenic assemblies and suitable superinsulation (not shown) are provided for maintaining the requisite liquid helium temperatures (4.2 K. to 1.8 K.) essential for the superconductive solenoid. Other electromagnetic systems may also be used for producing the ultrahigh pressures required in the process of the present invention.

In order to supplement the electromagnetic force by explosive force, a charge 20 of explosive is interposed between the armature 15 and the upper portion of the frame 1. The explosive may be in sheet or plastic form and may be a specially shaped explosive charge in order to direct the explosive force downwardly against the armature 15. Means is provided for detonating the explosive charge for example by an electric spark in synchronism with the application of force by the electromagnetic system. Thus for example the superconductive winding may be energized to produce progressively increasing pressure culminating in an ultrahigh magnetic field flux synchronized with detonation of the explosive to produce ultrahigh pressure.

The molding press as thus described is mounted on a steel base 16 and is enclosed by a bell jar or other envelope 17 which seats on the base with a hermetic seal 18. The bell jar 17 can be made of tempered glass but is preferably made of stainless steel fitted with heat resistant vacuum-tight ports or windows arranged for observing the entire process with light microscopes, scanning electron microscopes, x-ray diffraction and x-ray scattering techniques, thermometry and mass-spectrometry for detection of residual gasses. A high capacity high vacuum pump is indicated schematically at 19 for producing an ultrahigh vacuum within the envelope 17. The vacuum pump is of sufficiently high capacity that gasses produced by the explosion are quickly exhausted so as to restore the ultrahigh vacuum. If after evacuation to achieve thorough degassification it is desired to provide in the enclosure an inert atmosphere such as helium, a suitable supply and suitable connections (not shown) are provided. Likewise, suitable electrical connections are provided for the heating element 8 and the superconductive electromagnet winding 14 and for detonation of the explosive charge 20. Preferably one or more suitable thermocouples are provided for sensing the temperature of the mold.

The female mold is formed in such manner as to provide a cavity which defines on the molded implement an edge or point of the required sharpness. One method of achieving this is to form the mold cavity in a natural diamond or in natural carbonado with a laser beam. Alternatively, a block of molded diamond composition made in accordance with the process of the present invention can be used as a mold body in which the cavity is thus formed. Alternatively, the female mold can be formed by the powdered diamond technique as herein described with the use of natural or molded diamond knife to produce the mold cavity during the molding operation.

When the apparatus is used for converting ultrafine graphite particles into ultrafine diamond particles which are thereafter molded to form a polycrystalline diamond implement, the mold 3 instead of defining an ultrasharp edge or point may be cylindrical and is preferably of larger capacity in order to increase production. The ultrafine diamond powder thus produced after suitable cleaning to remove any remaining graphite particles is subsequently molded with the apparatus as described above. If the product is to have a special shape other than an ultrasharp edge or point, the mold 3,6 provides a cavity having the desired shape.

To prepare an ultraprecise diamond knife-edge mold, a selected optimum single crystal diamond edge with an edge length of about 3.5 mm and a cutting radius of 30–50 Å which will serve as a template is coated in an ultrahigh vacuum (of the order of $10^{-9}$ to $10^{-10}$ Torr) with a carbon or platinum-carbon film of atomic or pauci-atomic (=few atoms) thickness using the electric arc method. The layer thus formed will be electrically conducting and of such dimensions that it will give an atomic replica of the original knife edge when it is subsequently coated in the same ultrahigh vacuum with a supporting layer or film of a suitable metal for example platinum, rhenium or iridium. The metal-coated single-crystal diamond knife edge is then removed from the high vacuum system and is transferred to a special device for electrolytic coating of the critical zone surrounding the actual diamond knife edge facet with a supporting "electroformed" rhenium layer having a thickness of a few microns. The ultrafine replica of the diamond knife edge is thereby stabilized. The stabilized metallic replica which preserves the exact dimensions of the original diamond edge at the atomic level is then carefully removed from the single crystal edge, for example by differential coefficient of thermal expansion. It can thereupon serve as the female diamond knife-edge mold which is firmly anchored or secured in a suitably prepared carbonado or sintered polycrystalline diamond block which is grooved to receive it. The upper or male part of the diamond edge mold can be prepared in the same way by making allowance for the filling cavity which will constitute the desired polycrystalline synthetic diamond edge or point, the body or shank being likewise made of a polycrystalline diamond composite of suitable properties.

OPERATION

Use of the apparatus shown in the drawings for carrying out the process of the present invention will be readily understood from the foregoing description. The graphite powder together with any desired additives is placed in the cavity of the female mold 3 in such a way, e.g. by using electrophoresis or catophoresis, as to make sure that the particles get down into the submicroscopic mold edge by the passage of an electric current in the presence of a magnetic field of suitable strength and configuration. The filled and assembled mold is positioned together with the pressure applying means comprising the electromagnet and explosive charge in the frame 1. The envelope 17 is closed and the space within the envelope is evacuated to achieve an ultrahigh vacuum ($10^{-8}$ to $10^{-9}$ Torr) and thoroughly to degas the graphite powder and the entire assembly inside the envelope. The required temperature and pressure are thereupon applied to effect a conversion of the graphite powder to ultrafine diamond powder and the molding of the diamond powder to form the desired implement. Alternatively the pressure may be of such short duration as only to effect the conversion of the ultrafine graphite particles to ultrafine diamond particles without the molding and synthesis of the latter. When using a superconducting magnetic coil as shown, the magnetic field is built up gradually and suddenly increased to produce a magnetic shock to effect the final molding and synthesis of the polycrystalline diamond implement. The magnetic field used may be in the range of 500 to 200,000 gauss. Simultaneously the explosive charge 20 is detonated so as to superimpose the force of the explosive charge on the force produced by the superconducting electromagnet.

If it is desired to have certain additives only in certain portions of the implement to be produced, the powder containing such additives is suitably positioned in the mold. For example when the implement is to be used as an electrode or emitting element, low work function additives may be included only in the powder forming, for example, the tip or surface portions of the electrode. Moreover, a metal insert or lead for electrical connection can be inserted in the mold as desired.

When the additive is a ferromagnetic material selected from the group of iron, cobalt, nickel, steel, and alnico with slight admixture of rare earths such as samarium, dysprosium, europium, erbium, holmium, gadolinium and others, the high magnetic field (of about 60 to 80 kilogauss) generated by the superconducting magnet is continued after the process of application of high pressures and temperatures including the cooling down period to produce a permanent magnet which is uniquely stable, ultrahard and of micro-inch precision. To produce such magnets the molds are made with the desired configuration for example ring-shaped tubular, etc., for example by electron-microbeam machining.

FINISHING

The edge of an implement formed in accordance with the invention has a sharpness defined by a radius which measures only 3 to 100 Å and is straight and uniform. Conventional finishing or polishing of such edge is not only unnecessary but is highly undesirable as it would disrupt the extremely fine edge achieved by the process of the present invention. However, the synthetic polycrystalline diamond edges and points when removed from the mold have minute irregularities of near-atomic dimensions. In order to smooth out such irregularities, the ultrasharp edges or points are irradiated by an electron beam in an ultrahigh vacuum. The complex effect of the electron microbeam on minute protruding points is utilized directly to obtain a characteristic atomic smoothness or glazing effect which represents a decisive factor in producing a whole new class of diamond polycrystalline ultrasharp edges, points and complex surfaces which are in many cases distinctly superior in wear resistance and unprecedented toughness. In fact it has been found that the final treatment with electron microbeam irradiation or with ion or other forms of controlled irradiation, e.g. x-ray and gama-ray, imparts a special kind of "annealing" and increased hardness or durability to the polycrystalline diamond composite. Moreover, introducing a controlled jet of certain gasses such as highly purified oxygen, hydrogen, water vapor, methane, etc., results in a unique process of atomic etching and polishing which yields results which are orders of magnitudes superior to the finest mechanical abrasion and polishing techniques since all detrimental factors and contamination can be avoided under controlled ultrahigh vacuum or cryogenic conditions without mechanical perturbation of the atomic lattice structure.

IMPLEMENTS PRODUCED

In accordance with the present invention it is possible to produce an implement having an edge with a sharpness defined by a radius of 3 to 100 Å and is straight and uniform as in the case of a single crystal diamond knife as described in my U.S. Pat. No. 3,646,841. However, in contrast with a monocrystalline diamond knife made from a natural diamond, a polycrystalline diamond implement made in accordance with the process of the present invention can be of any desired length.

If the implement is to be used for electrical purposes for the emission of electrons, ions, neutrons, x-rays, coherent or incoherent light or high frequency electromagnetic radiation, it is provided with inclusions of suitable low work function materials such as tungsten, rhenium, lanthanum, barium, caesium etc. as described above. Such inclusions may be throughout the implement or may be limited to local portions for example the edge portion or a surface layer. Likewise as described above, the molded implement may include bonding media such as lanthanum borate. When it is desired to make an electrical connection to the molded implement, a suitable metal insert or lead can be molded into it. It will be understood that many variations are made possible by the process in accordance with the present invention. Thus an emitter may be made in the form of an edge, a point or a comb or other shape with a plurality of points. Moreover, the point or points instead of projecting may be "negative" or female points, i.e. in the form of a sharp pointed cavity or recess. The included angle of the edge or point may be selected as desired for example 30° to 60° and the sides instead of being planar may be curved for example hollow ground if desired.

Moreover, when ferro-magnetic materials are included as described above for example in a proportion of 20 to 55 wt.% permanent magnets which are uniquely stable, ultrahard and of micro-inch precision can be produced. Such magnets may have a sharp edge or point or alternatively may be of other shape for example U-shaped, torroidal or tubular. Moreover, the possibility of making polycrystalline diamond composites with additives conferring special physical and physico-chemical properties which combine the advantages of direct ultraprecision molding to micro-inch tolerances and unprecedented size introduces a novel class of ultrahard material componentry. Typical examples include ultraprecision molded unitary diamond-like mechanical and optical components, high-field permanent magnets for motors and generators, lenses, television and radar components, as well as novel electrets, high temperature thermoelectro elements, radiation-resistant nuclear reactor control rods and containment parts, etc.

ADVANTAGES OF INVENTION

In accordance with the present invention it is possible to produce ultrasharp polycrystalline diamond edges and points having an edge with a radius less than 100 Å and other ultrahard microprecision implements and components from abundant and relatively inexpensive graphite instead of scarce and expensive diamonds. Moreover, ultrasmall graphite particles which are converted into ultrasmall diamond particles and molded by high heat and pressure to produce such implements and components are convenient and economically produced by an electric arc in ultrahigh vacuum or by sputtering in an argon or helium atmosphere to achieve a particle size of less than 100 Å and preferably between 3 and 50 Å thereby avoiding the far more expensive process of fragmenting natural or synthetic diamonds and classifying the resulting particles to achieve a sufficiently small and uniform particle size. The use of a superconducting magnet for the application of pressure in converting the ultrafine graphite particles into ultrafine diamond particles and molding the latter into polycrystalline diamond composites not only provides a convenient and effective way of achieving the required ultrahigh pressure but also when the composite includes ferromagnetic material, the high intensity magnetic field produced by the superconducting magnet permanently magnetizes the composite so as to achieve an ultrahard microprecision permanent magnet.

The finishing process in accordance with the present invention by means of an electron microbeam or a controlled jet of certain gasses achieves not only an atomically smooth surface but further imparts an additional quality of annealing or hardening providing superior wear resistance and unprecedented toughness and durability.

EXAMPLES

The following typical but nonlimiting examples are carried out with the integrated superconducting ultrahigh magnetic field and ultrahigh cryogenic vacuum apparatus illustrated by way of example in the drawings and using electron beam heating primarily. The relatively small size of the ultrasharp knife edges produced was determined by the size of the ultraprecision mold which was made as described above using a monocrystalline diamond knife edge as a template. In its present form the apparatus permits scaling up the molds and samples by a few orders of magnitude and a combination with modified apparatus incorporating the magnetic-pulsed and the magnetic-implosion method together with larger and more powerful high field effect superconducting magnets and with polycrystalline diamond molds especially prepared by electron beam machining should readily permit the routine production of polycrystalline synthetic diamond implements which are at least several cubic centimeters in size.

EXAMPLE I

Production of Synthetic Polycrystalline Diamond Edge or Point With an Edge Curvature of 30 to 50 Angstroms A mold for the polycrystalline diamond knife-edge is prepared as described above using as a template, a single crystal diamond edge with an edge length of 3.5 mm and a cutting edge radius of 30–50 Å. Ultrafine graphite particles are produced from natural or synthetic graphite preferably selected for abundance of the rhombohedral form of graphite by producing an electric arc pulsed or continuous AC or DC current in an ultrahigh vacuum, e.g. $10^{-7}$ to $10^{-10}$ Torr using specially adapted equipment for continuous or automated production and collection through special ultrahigh vacuum seals and valves of predominantly rhombohedral graphite particles which can be further separated into still more homogeneous populations of particles ranging in size from 3 to 50 Å and from 50 to 100 Å for example by using differential density gradient separation. An alternative process which is less reproducible but also less expensive involves the sputtering of the graphite rods in an inert atmosphere such as argon or helium using high voltage. In all cases the oxidation or contamination of the rhombohedral graphite particles is neglible and the recovery rate is several orders of magnitude more efficient than any known mechanical or physico-chemical crushing, grinding or other fragmentation process. Typically, a complete set of graphite electrodes having a dimension of for example $10\times 2000$ mm is totally converted into ultrafine graphite particles within a few hours. Electron diffraction and high resolution electron microscopy confirms the particle size and clearly shows the characteristic crystalline lattice spacing conforming to the rhombohedral structure. After classification by the density gradient method, the particles can be collected and dried in an ultrahigh vacuum. After systematic optical and electron microscopic and electron defraction and x-ray defraction control, the ultrafine rhomboidal graphite particles are collected and compacted in the mold of apparatus such as that shown in the drawing. They are thereupon subjected to explosive or pulsed magnetic shock pressures of the order of 100 to 1000 kb for 1 to 10 microseconds at a controlled temperature of the order of 2000° to 2500° K. Instead of using the mold for producing an ultrasharp edge, a larger mold with a cylindrical cavity is used so as to process larger amounts of the graphite powder. The application of heated pressure is carried out in an ultrahigh vacuum of for example $10^{-8}$ to $10^{-9}$ Torr. The ultrafine graphite particles are thereupon converted to ultrafine diamond particles of comparable size, i.e. less than 100 Å.

The resulting synthetic diamond particles thus produced are further subjected to a series of cleaning procedures for example treatment with dry hydrogen at about 1200° K. and a pressure of about 10 to 50 atmospheres in a special quartz tube or boat mainly to remove any residual graphite. The cleaned ultrafine diamond particles are then filled into the special ultraprecision diamond edge or point or other mold and subjected to high pressures of the order to 80 to 90 kb and temperatures of 2400° to 2500° K. in a vacuum of $10^{-8}$ to $10^{-9}$ Torr for periods ranging from a few seconds to several minutes.

After a suitable cooling down period, the ultrahigh vacuum and cryogenic systems of the apparatus are turned off and the finished ultrasharp diamond knife-edge or point is removed from the mold with the corresponding supporting polycrystalline support or shank. High resolution light and electron microscope inspection will usually reveal very slight irregularities at the atomic level when compared with single crystal diamond knife edges. Hence a final step of electron beam glazing or polishing is desirable to obtain atomically smooth edges. In fact the irradiation with electron microbeams with ions or other types of ionizing radiation appears to impart an additional quality of annealing or hardening to produce an atomically smooth wear-resistant surface of unprecedented toughness and durability. Alternatively, introducing a control jet of certain gasses, for example highly purified oxygen, hydrogen, water vapor or methane results in a unique process of atomic etching and polishing which yields results orders of magnitude superior to the finest mechanical abrasion and polishing since all detrimental factors and contamination are avoided under controlled ultrahigh vacuum and cryogenic conditions without mechanical perturbation of the atomic lattice structure.

It is a distinctive feature of the apparatus for producing polycrystalline diamond composites in accordance with the present invention that the high field superconducting solenoids forming part of the system can be suitably arranged and modified and combined with the already available field emission electron point sources operating in a cryogenic ultrahigh vacuum to become an ideal cryoelectronic microscope and an electron beam irradiation instrument for both testing and treating the molded product.

EXAMPLE II

Polycrystalline Diamond Composite Used As Emitter

Ultrafine diamond particles directly synthesized from ultrafine rhomboidal graphite particles as in Example I are mixed intimately using ultrasonic devices with ultrafine particles prepared by high vacuum arc evaporation of sputtering in noble gas under reduced pressure of inclusions selected from the group consisting of tungsten, rhenium, lanthanum hexaborate, barium and caesium. The proportion of inclusions is about 20 to 40 wt.%. The mixture thus obtained is compacted into the mold of the apparatus shown in the drawings which may be a mold for producing an ultrasharp edge or point or an ultraprecise indentation mold for producing comb cathodes to obtain ultrahigh T-F emission. In these cases molding at pressures of the order of 80 to 90 kb while heating the powder to a temperature of the order of 2400° K. are generally adequate although higher pressures and temperatures may also be used. If desired the emitters may be finished as described in Examiner I.

EXAMPLE III

Polycrystalline Diamond Composites Used As High Field Permanent Magnets

The ultrafine diamond powder obtained as in Example I is intimately mixed with ultrafine particles of ferromagnetic materials selected from the group of iron, cobalt, nickel, steel and alnico with a slight admixture of rare-earths such as samarium, dysprosium, europium, erbium, holmium, gadolinium, etc. Alternatively the additive may be applied as high vacuum evaporated ultrathin coatings of the diamond particles. The diamond particles with the ferromagnetic additive which may be in proportion of 20 to 55 wt.% is oriented and compacted in a special mold which is produced by electron microbeam machining of natural polycrystalline carbonado or synthetic polycrystalline diamond to produce a mold cavity of desired configuration, for example ring-shaped or tubular. The molding operation is as in Example I except that the ultrahigh magnetic fields of about 60 to 80 kilogauss generated by the superconducting magnets are continued after the application of high pressures and temperatures including the cooling down period so as to permanently magnetize the diamond composite to produce permanent magnets which are uniquely stable, ultrahard and of micro-high precision. Such magnets have constant magnet fields of the order of 20 to 30 kilogauss at room temperatures and of 30 to 40 kilogauss at cryogenic (liquid hydrogen and liquid helium) temperatures. While the proportion of rare-earths included in the composition may vary, it is preferably a few percent, for example 5 or 10 wt.% at the most.

EXAMPLE IV

Polycrystalline Diamond Composites For Use As Ultraprecision Machine And Electron Components Ultrafine diamond powder produced from ultrafine graphite particles as described in Example I, are intimately mixed with ultrafine particles of aluminum oxide, silicon carbide, tungsten carbide, niobium, tantalum carbide, zirconium oxide, boron, boron nitride, titanium boride, magnesium oxide, or chromium oxide in proportions of about 25 to 68 wt.%. The powder mixture is compacted in a mold produced by electron microbeam machining as described in Example III to provide a cavity of the precise shape and size desired. The powder is thereupon molded and sintered at pressures of about 80 to 90 kb and temperatures of about 2400° to 2500° K. in an ultrahigh vacuum to produce extremely hard and strong ultraprecision components usable in mechanical, optical and electronic equipment.

MODIFICATIONS

While preferred embodiments of the invention are herein described, it will be understood that the invention is of wide applicability and capable of many modifications and variations. Thus although reference has been made to using natural or synthetic graphite as the starting material, similar materials such as graphitic carbons, vitreous carbons, and related inexpensive and abundant materials preferably of the rhombohedral phase may be used in like manner. While the mold shown in the drawing is for the production of an ultrasharp knife edge, it will be understood that other molds may be used for producing polycrystalline diamond composites of different shapes and sizes. As still other modifications can readily be made by those skilled in the art, it will be understood that the invention is in no way limited to the preferred embodiments herein illustrated and particularly described.

What is claimed is:

1. A method of producing a microprecision polycrystalline diamond implement which comprises:
   preparing ultrafine particles of predominantly rhombohedral graphite having a particle size less than 100 Å,
   placing a selected quantity of said graphite particles in a mold having a mold cavity of selected size and shape,
   placing said mold in a gas-tight enclosure and evacuating said enclosure to produce therein an ultrahigh vacuum thoroughly to degas said graphite particles and mold, and
   subjecting said graphite particles in said mold to pressure of the order of at least 80 Kb and temperature of 2000°–3000° K. in an ultrahigh vacuum or inert gas to convert said ultrafine graphite particles to ultrafine diamond particles and to mold and sinter said ultrafine diamond particles into a microprecision polycrystalline diamond implement of predetermined size and shape.

2. A method according to claim 1, in which said pressure is applied electromagnetically and culminates in a pulsed magnetic shock.

3. A method according to claim 2, in which further pressure is applied by explosive shock synchronized with said magnetic shock.

4. A method according to claim 1, in which said conversion of ultrafine graphite particles into ultrafine diamond particles and said molding and sintering of said ultrafine diamond particles into said microprecision polycrystalline diamond implement are effected in a continuous operation by continuing application of said pressure and temperature.

5. A method according to claim 4, in which additives comprising ultrafine particles of metallic material selected from the group consisting of nickel, cobalt, chromium, manganese, palladium, iridum, platinum, tantalum, ruthenium, rhenium, lathanum hexaborate, barium and caesium are intimately mixed with said graphite particles before application of said pressure and temperature.

6. A method according to claim 4, in which a coating of metallic material selected from the group consisting of nickel, cobalt, chromium, manganese, palladium, iridium, platinum, tantalum, ruthenium, rhenium, lathanum hexaborate, barium and caesium is applied to said ultrafine graphite particles before applications of said pressure and temperature.

7. A method according to claim 4, in which ultrafine particles of a binary catalytic system comprising metallic material selected from the group consisting of titanium, zirconium, niobium, molybdenum, tungsten, and hafnium combined with metallic material selected from the group consisting of copper, silver and gold are intimately mixed with said ultrafine graphite particles before application of said pressure and temperature.

8. A method according to claim 4, in which a coating of a binary catalytic system comprising metallic material selected from the group consisting of titanium, zirconium, niobium, molybdenum, tungsten and hafnium combined with metallic material selected from the group consisting of copper, silver and gold is applied to said ultrafine graphite particles before application of said pressure and temperature.

9. A method according to claim 4, in which ferromagnetic material is included as an additive to said ultrafine graphite particles and in which said mold and its contents are subjected during the molding operation to a high magnetic field which is continued during cooling of the molded implement to produce a microprecision high field permanently magnetized polycrystalline diamond implement.

10. A method according to claim 9, in which said ferromagnetic material is selected from the group consisting of iron, cobalt, nickel, steel and alnico.

11. A method according to claim 10, in which a small proportion of rare-earths is included with said ferromagnetic material.

12. A method according to claim 1, in which after conversion of ultrafine graphite particles into ultrafine diamond particles, said diamond particles are treated to remove any unconverted graphite particles and are then molded and sintered by high pressure at high temperature in an ultrahigh vacuum or inert gas into a microprecision polycrystalline diamond implement of predetermined size and shape.

13. A method according to claim 12, in which said graphite particles are coated with a high melting point material to inhibit cohesion of said graphite particles by said heat and pressure applied to said graphite particles to convert said graphite particles to diamond particles.

14. A method according to claim 12, in which additives comprising ultrafine particles of metallic material selected from the group consisting of nickel cobalt, chromium, manganese, palladium, iridium, platinum, tantalum, ruthenium, rhenium, lathanum hexaborate, barium and caesium are intimately mixed with said diamond particles before application of said pressure and temperature to said diamond particles.

15. A method according to claim 12, in which a coating of metallic material selected from the group consisting of nickel, cobalt, chronium, manganese, palladium, iridium, platinum, tantalum, ruthenium, rhenium, lathanum hexaborate, barium and caesium is applied to said ultrafine diamond particles before application of said pressure and temperature to said diamond particles.

16. A method according to claim 12, in which ultrafine particles of a binary material selected from the group consisting of titanium, zirconium, niobium, molybdenum, tungsten, and hafnium conbined with metallic material selected from the group consisting of copper, silver and gold are intimately mixed with said ultrafine diamond particles before application of said pressure and temperature to said diamond particles.

17. A method according to claim 12, in which a coating of a binary catalytic system comprising metallic material selected from the group consisting of titanium, zirconium, niobium, molybdenum, tungsten and hafnium combined with metallic material selected from the group consisting of copper, silver and gold is applied to said ultrafine diamond particles before application of said pressure and temperature to said diamond particles.

18. A method according to claim 12, in which ferromagnetic material is included as an additive to said ultrafine diamond particles and in which said mold and its contents are subjected during the molding operation to a high magnetic field which is continued during cooling of the molded implement to produce a microprecision high field permanently magnetized polycrystalline diamond implement.

19. A method according to claim 18, in which said ferromagnetic material is selected from the group consisting of iron, cobalt, nickel, steel and alnico.

20. A method according to claim 19, in which a small proportion of rare-earths is included with said ferromagnetic material.

21. A method according to claim 1, in which after having been molded and sintered, said implement is irradiated with an electron microbeam to obtain an atomic smoothness and glazing effect.

22. A method according to claim 1, in which after having been molded and sintered, said implement is subjected to a controlled jet of highly purified gas to effect an atomic etching and polishing.

23. A method of producing a microprecision polycrystaline diamond implement which comprises:
   molding a polycrystaline diamond body of precise size and shape with the application of heat and ultrahigh pressure in an ultrahigh vacuum or inert gas, and thereafter
   irradiating said molded body with an electron microbeam to smooth out minute irregularities and obtain an atomic smoothness and glazing effect.

24. A method of producing a microprecision polycrystaline diamond implement which comprises:
   molding a polycrystaline diamond body of precise size and shape with the application of heat and ultrahigh pressure in an ultrahigh vacuum or inert gas, and thereafter
   subjecting said molded body to a controlled jet of highly purified gas to effect an atomic etching and polishing.

* * * * *